United States Patent [19]

Farrell et al.

[11] Patent Number: 5,422,743
[45] Date of Patent: Jun. 6, 1995

[54] OPERATOR INVOKED DOCUMENT DEFECT REPAIR TEMPLATES

[75] Inventors: Michael E. Farrell, Fairport; Randall R. Hube, Rochester; Paul M. Butterfield, Fairport, all of N.Y.

[73] Assignee: Xerox Corporation, Stamford, Conn.

[21] Appl. No.: 996,330

[22] Filed: Dec. 23, 1992

[51] Int. Cl.$^6$ .............................................. H04N 1/21
[52] U.S. Cl. ................... 358/537; 358/540; 358/450; 358/452
[58] Field of Search ............... 358/531, 537, 540, 450, 358/452, 448, 453

[56] References Cited

U.S. PATENT DOCUMENTS

| | | | |
|---|---|---|---|
| 3,716,296 | 2/1973 | Springer et al. | 358/448 |
| 5,136,399 | 8/1992 | Aoyama | 358/296 |
| 5,140,440 | 8/1992 | Sasaki | 358/453 |
| 5,140,444 | 8/1992 | Klein et al. | 358/447 |
| 5,162,918 | 11/1992 | Muramatsu | 358/300 |
| 5,191,440 | 3/1993 | Levine | 358/450 |
| 5,335,095 | 8/1994 | Kageyama et al. | 358/500 |

Primary Examiner—Benjamin R. Fuller
Assistant Examiner—Randy W. Gibson
Attorney, Agent, or Firm—Oliff & Berridge

[57] ABSTRACT

A process for repairing common defects in the electronic page images of a print job being processed by an electronic reprographic system that includes a printer for producing prints from the digitized page images in response to job program instructions and a user interface (UI) with display screen for inputting job program instructions for each print job. The process uses document defect repair templates, either existing or created by the operator and stored in a system library, to electronically mask document defects in the page images. Additionally, the process is applicable before or after hardcopy original documents have been scanned by the reprographic system.

19 Claims, 10 Drawing Sheets

EXAMPLES OF PREDEFINED DDR TEMPLATES

3 HOLE PUNCHED PAPER

PORTRAIT STAPLE HOLES

DOG EARS

LANDSCAPE STAPLE HOLES

EXAMPLES OF CUSTOMIZED DDR TEMPLATES

PRECUT TAB SHOWAROUND

PAGE NUMBERS

HEADERS/FOOTERS

EXAMPLES OF PREDEFINED DDR TEMPLATES

3 HOLE PUNCHED PAPER

PORTRAIT STAPLE HOLES

DOG EARS

LANDSCAPE STAPLE HOLES

EXAMPLES OF CUSTOMIZED DDR TEMPLATES

PRECUT TAB SHOWAROUND

PAGE NUMBERS

HEADERS/FOOTERS

OPERATOR INVOKED DOCUMENT DEFECT REPAIR TEMPLATES

BACKGROUND OF THE INVENTION

1. Field of the Invention

This invention relates to a process where an operator may select electronic document defect repair (DDR) templates to mask document substrate defects such as pre-drilled holes, dog ears, staple holes, and the like, when conducting system reprographic operations. Such templates comprise one or more opaque elements electronically positioned with respect to the input document image which the system control programs allow to be recalled. Additionally, the operator may save and recall both predefined and operator defined electronic DDR templates, including the size and position of all elements of the templates.

2. Description of Related Art

Currently available system reprographic products, such as the DocuTech electronic reprographic system, permit operators to electronically cover rectangular areas of digitized page images with an opaque mask. One or more masks can be applied to one or more pages of a job, but masks can only be defined once the page or pages have been scanned by the reprographic system. Masks can also be removed, i.e., removing a mask restores the original appearance of the image page.

Known prior art electronic reprographic systems, also support "windowing" during job programming. The window, or crop, feature permits the operator to specify a single rectangular area on a page image, or range of images, for deletion. Windows cannot be removed, however, because the image in the window area is not saved elsewhere in the system, i.e., the image data in the window is deleted.

An operator may also use the window, or crop, feature to repair document defects. However, since this feature provides only single, rectangular shapes to mask the defects, it has inherently limited selection. Additionally, using the crop feature to repair a document results in loss of the substrate image along an entire edge of the document.

Finally, another prior art mask feature does support the application of more than one mask, thereby providing improved selectivity over window or crop, however, the inability to save the masks can make the process of document defect repair using discrete masks extremely time consuming.

Typically then, reprographic products capable of accurate image reproduction reproduce all substrate defects (e.g., staple holes, tears and dog ears) present on the input document. Therefore, system reprographic operators need an efficient method of masking out repeatable document substrate defects and other repeatably positioned images on groups of documents.

SUMMARY OF THE INVENTION

It is thus an object of the invention to obviate the foregoing drawbacks of the prior art by providing an improved process for repairing common defects in the electronic page images of a print job being processed by an electronic reprographic system.

This and other objects and advantages are obtained by the inventive process for repairing common defects in the electronic page images of a print job being processed by an electronic reprographic system, where the system includes a printer for producing prints from the digitized page images in response to user commands and a user interface, with a display screen and at least one command input device (e.g., mouse, touchscreen, or light pen) for inputting the job program instructions for the print job, and comprises the steps of: a) selecting at least one set of pages within the print job for DDR; b) selecting at least one DDR template from a library for overlapping association with at least one set of pages having at least one defect, to electronically mask out the at least one defect; c) assigning the at least one DDR template to each page of the at least one set of pages within the print job; d) repeating steps a–c for all remaining sets of pages within the print job containing defects; e) completing job programming; f) scanning print job pages thereby creating digitized page images of each page; g) retrieving the at least one DDR template; h) applying the at least one DDR template assigned to the page image of each page assigned in step (c); i) storing the page images with at least one DDR template applied in at least one of a main memory and a disk of the reprographic system; and j) printing the print job containing the page images with at least one DDR template applied. Importantly, DDR templates may also be applied post scan, i.e., after acquisition (stored in memory, having been captured by a scanner or received via a network).

Thus, a process is provided whereby system operators may apply one or more DDR templates to a range of pages in a print job, either before or after the job has been scanned. A DDR template is a collection of one or more electronic masks of predetermined size and position which can be created by a system operator using the user interface (user interface includes display screen, keyboard and pointing device such as, a mouse or light pen) to input necessary user commands as needed, or it can be selected from a library or directory of stored DDR templates resident in main memory and accessed through user commands. The DDR template directory may contain both operator created templates and predefined DDR templates stored in system main memory.

The process described herein is unique when compared to such prior art electronic reprographic systems, in that it permits an operator to save DDR templates for reuse whereas DocuTech and other known systems do not support saving the size and position of masks for reuse. Further, the prior art does not apply masks or windows at operator defined sizes and positions. For example, invoking the DocuTech mask or window feature causes the mask or window to be initially centered on the page at one-quarter size. The operator must then resize and reposition the mask or window as required. Since the DocuTech system applies windows in the scanner section, which only supports one window at a time, the DocuTech system is constrained to one window per scanned page. The inventive process described herein calls for applying one or more DDR templates, containing one or more masks per scanned page.

The advantages of the claimed process include: 1) providing electronic DDR templates that improve operator productivity by accelerating operator tasks, i.e., complex templates can be saved, thereby eliminating the need to recreate for each use, and templates may be applied prior to scanning, i.e., during job programming, therefore, opening the job to display the digitized (scanned) images is no longer required; 2) DDR templates for common document defects may be predefined and stored within the system, thereby allowing operators to access predefined DDR templates using the display screen and applying the templates without having to be trained on how to create them; 3) the process exploits the inherent strength of electronic reprographics over light lens reprographics, i.e., electronic reprographics manipulates every image prior to printing (:at a minimum digitizing the image) whereas, light lens systems seek to avoid image manipulation; 4) multi-element DDR templates allow the operator to be more selective when repairing document defects than the window, crop, or mask feature currently available in reprographic systems, (e.g., using crop to eliminate pre-drilled hole defects in a document would cause a loss of all information in the left margin, whereas a multi-element DDR template would retain the margin notes located between the holes); and 5) providing an efficient means to repair document defects enables scanner manufacturing cost reductions since the operator can easily remove scanner imaging artifacts caused by document defects.

An example of possible cost reductions resultant from the inventive concept, platen clamp artifacts which will show through at document voids could be removed electronically using DDR templates, thereby allowing greater variability in platen clamp reflectance and reducing the cost of machine manufacture. As a result, additional features could be added, e.g., marks can be added to the platen clamp such that a device for reading the marks could be used to detect documents left on the platen glass or for document size sensing. Also, secondary illumination sources (used to control shadows caused by document voids) could be eliminated, thereby reducing the overall manufacturing cost of the electronic reprographic system.

Other objects, advantages and salient features of the invention will become apparent from the detailed description which, taken in conjunction with the annexed drawings, discloses a preferred embodiment of the invention.

BRIEF DESCRIPTION OF THE DRAWINGS

Referring now to the drawings which form part of this original disclosure.

DETAILED DESCRIPTION OF THE PREFERRED EMBODIMENT

The process for repairing common defects in the electronic page images of a print job being processed by an electronic reprographic system will be described herein.

For a general understanding of the invention, reference is made to the drawings. In the drawings, like reference numerals have been used throughout to designate identical elements.

Figure 2:
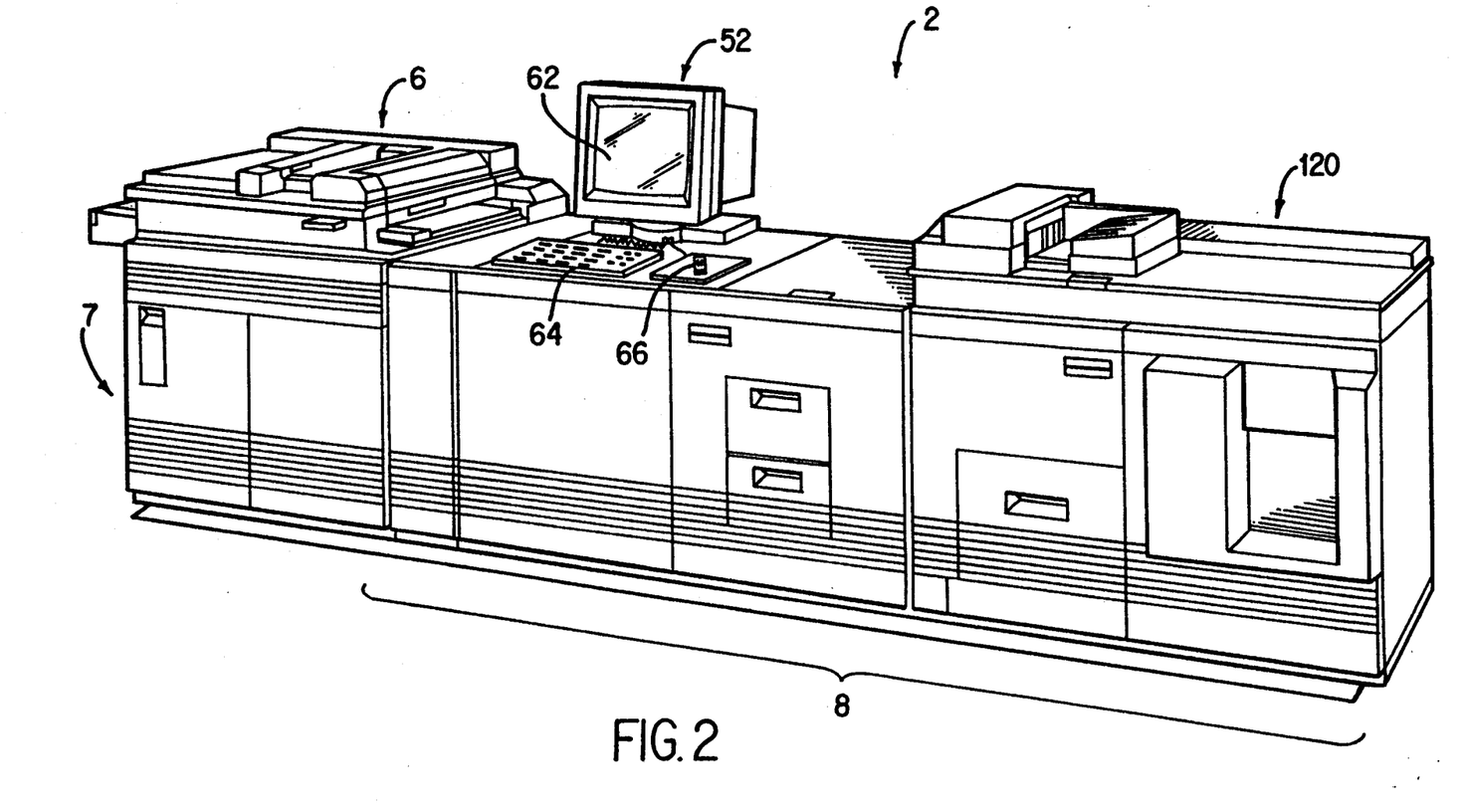
FIG. 2 is a view depicting an electronic reprographic system.
Figure 3:
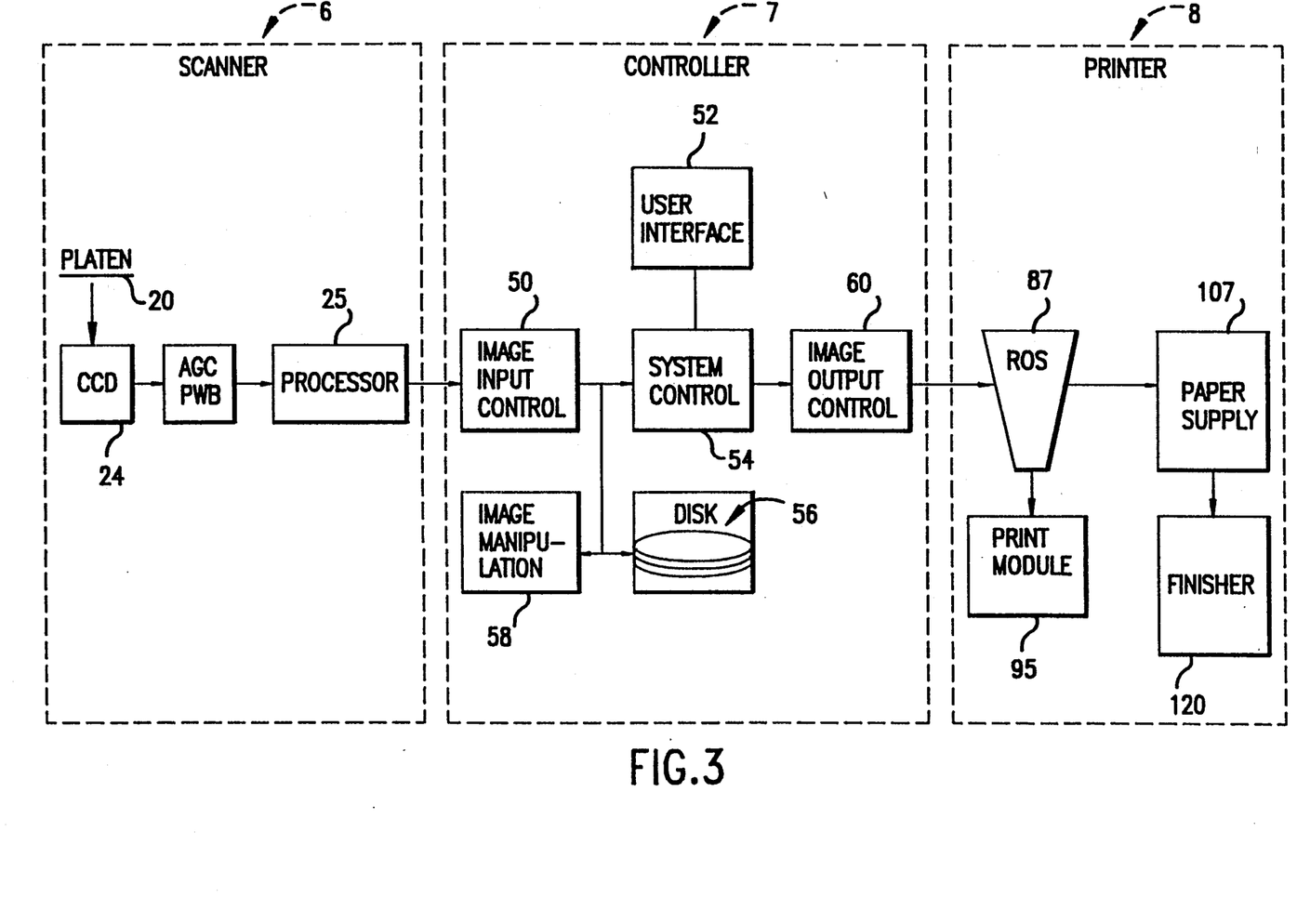
FIG. 3 is a block diagram depicting the imager elements of the reprographic system shown in FIG. 2.

FIGS. 2 and 3 show an exemplary electronic reprographic system 2 for processing print jobs in accordance with the teachings of the present invention. Reprographic system 2, for purposes of explanation, is divided into a scanner section 6, controller section 7, and printer section 8. While the invention is described with reference to a specific reprographic system, i.e., DocuTech, the invention may be used with other types of system reprographic products having similar capabilities.

Scanner section 6 (see FIGS. 3 and 4) incorporates a transparent platen 20 on which each image page 22 of the document to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Figure 4:
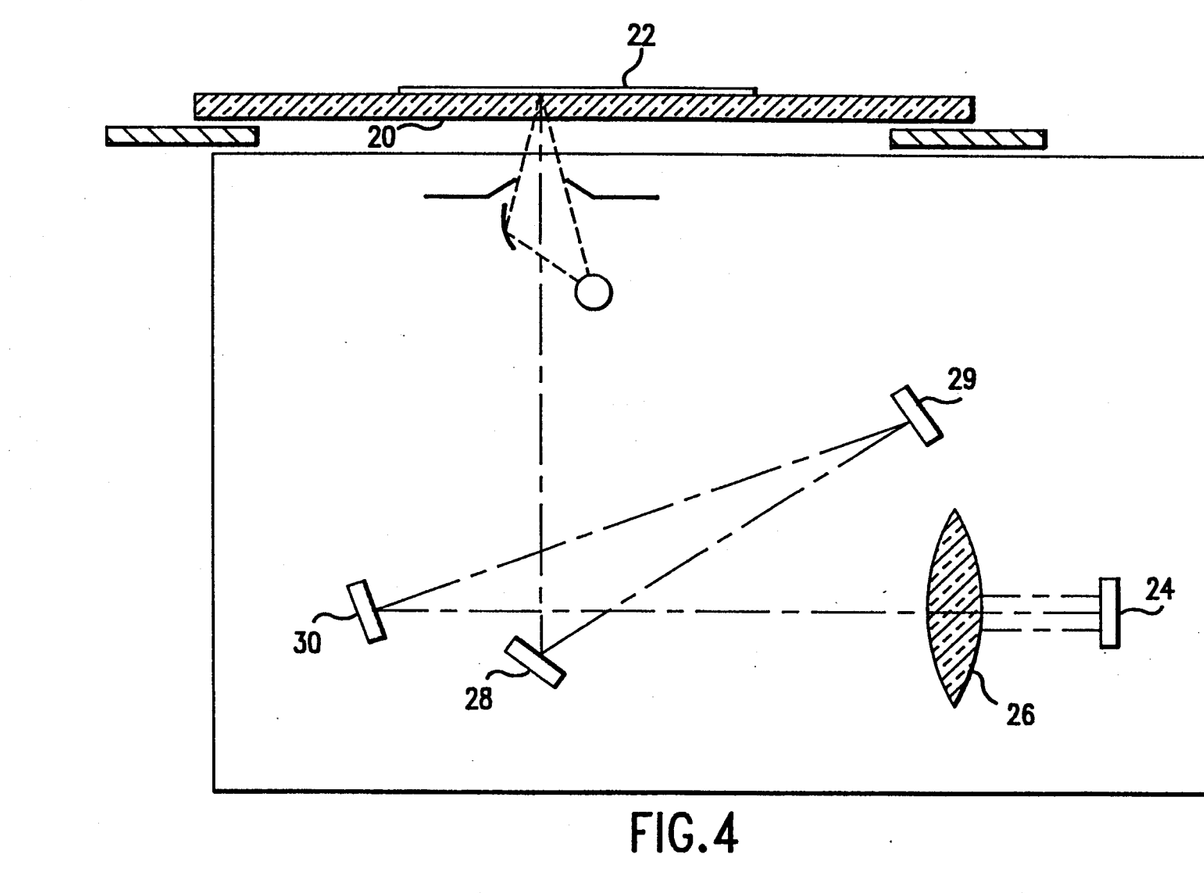
FIG. 4 is a schematic view showing certain construction details of the document scanner for the reprographic system shown in FIG. 2.

Processor 25 converts the analog image signals output by array 24 to digital image signals and processes the image signals as required to enable system 2 to store and handle the image data in the form required to carry out the job programmed. Processor 25 also provides enhancements and changes to the image signals, such as filtering, thresholding, screening, and reduction/enlarging.

Printer section 8 comprises a laser type printer and, for purposes of explanation, is separated into a Raster Output Scanner (ROS) section 87, print module section 95, paper supply section 107, and high speed finisher 120.

Finally, controller section 7 is, for explanation purposes, divided into an image input controller 50, User Interface (UI) 52, system controller 54, main memory 56, image manipulation section 58, and image output controller 60. Further, as best seen in FIG. 2, UI 52 controls a combined operator controller/CRT display consisting of an interactive touchscreen 62, keyboard 64, and mouse 66. UI 52 interfaces the operator with reprographic system 2, enabling the operator to program print jobs and other instructions (as will be detailed below) and to obtain system operating information, instructions, programming information, and diagnostic information. Items displayed on touchscreen 62, such as files and icons, are actuated by either touching the displayed item on screen 62 with a finger or by using mouse 66 to point a cursor to the item selected and keying the mouse 66.

When the image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation and make ready are carried out. However, DDR processing occurs generally in system control 54. Applying the DDR in system control 54 is the most general solution since it will support permanent and temporary DDR's and is available for use on all images, not just locally scanned images. Where image file size reduction is desired, however, permanent DDR's may be applied in the processor 25 or as part of the image capture process in general. Following processing, the data may be returned to main memory 56, sent to UI 52 for display on touchscreen 62, or sent to image output controller 60.

Additional details of the construction and operation of the reprographic system 2 discussed above will not be detailed herein, since such are well known in the reprographic art. What will be described, however, is a process for repairing common defects in electronic page images 22 of a print job being processed by an electronic reprographic system 2, such as the one discussed above (see FIGS. 5a through 6b). Note that, for ease of presentation, the processor 25, main memory 56 and UI 52 interconnections and software controls therebetween will not be discussed in any great detail, since such is known in the art.

Figure 1:
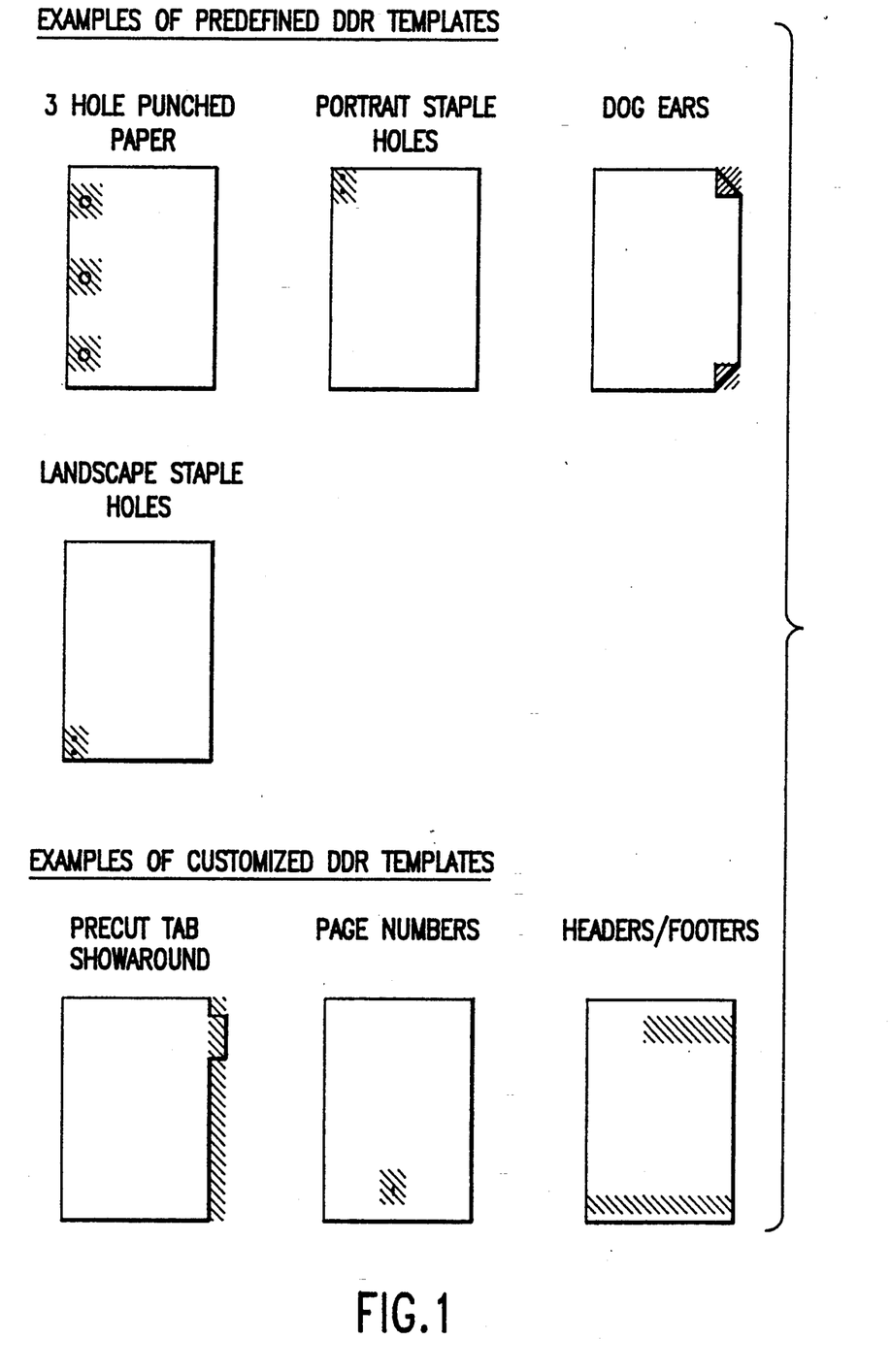
FIG. 1 shows examples of predefined and customized DDR templates.

When applying a DDR template to the page images 22 of a particular print job, operators, using the inventive process detailed below, are able to specify by user commands, using, preferably, the touchscreen 62, whether the templates are temporary (i.e., removable) or permanent (see FIG. 5d). That is, if the templates are applied temporarily, the underlying substrate information is retrievable when the template is later removed. If the template is applied permanently, however, the masked information is permanently lost. Additionally, user commands may be employed to allow multiple DDR templates to be applied concurrently using the touchscreen 62, e.g., a template for three-hole drilled paper can be combined with a template for dog ears for use on a document that has both types of defects (see FIGS. 1 and 6b). Additionally, predefined templates can be provided for common defects on standard sized documents, e.g., a masking template to mask the holes in three-hole drilled 8½×11 paper (see FIG. 5c).

Referring now to FIGS. 5a–5d, jobs are programmed in an interactive job program mode stored in main memory 56 and accessed using the UI 52 in which there is displayed on touchscreen 62 a job ticket 150 with job level menu 152 for the job being programmed. Job ticket 150 displays various job selections programmed, including page level menu 154 (where DDR templates are selected), while job level menu 152 displays the basic instructions to the system for printing the job. It should be obvious that the display screens 5a–5d are exemplary. However, it is understood that such displays will vary from system to system and those of FIGS. 5a–5d are merely provided as an example of one way the system described herein could be implemented.

Figure 6A:
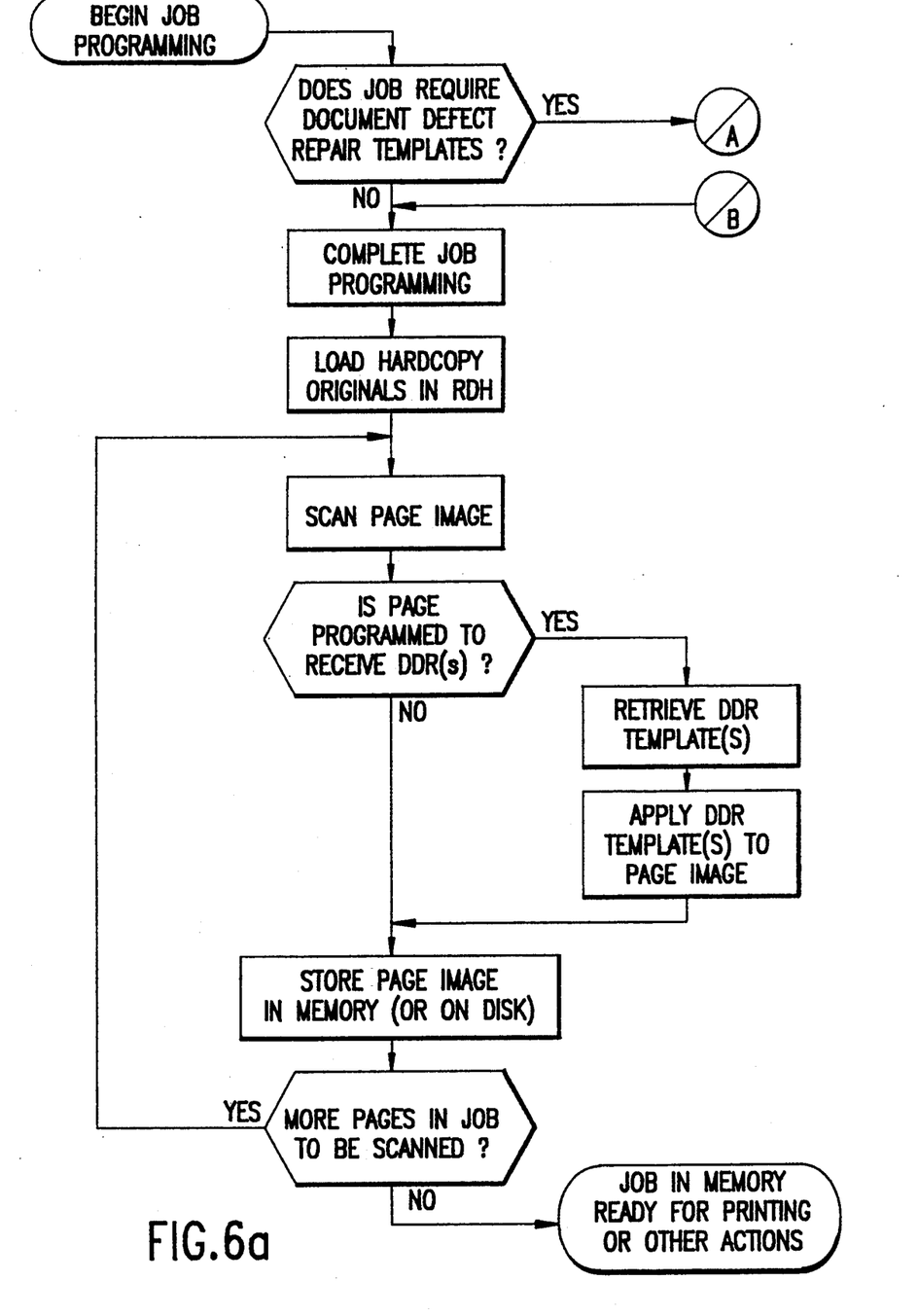
FIGS. 6a–6b provide a flowchart of a process for repairing common defects in the electronic page images of a print job being processed by an electronic reprographic system according to the present invention.
Figure 6B:
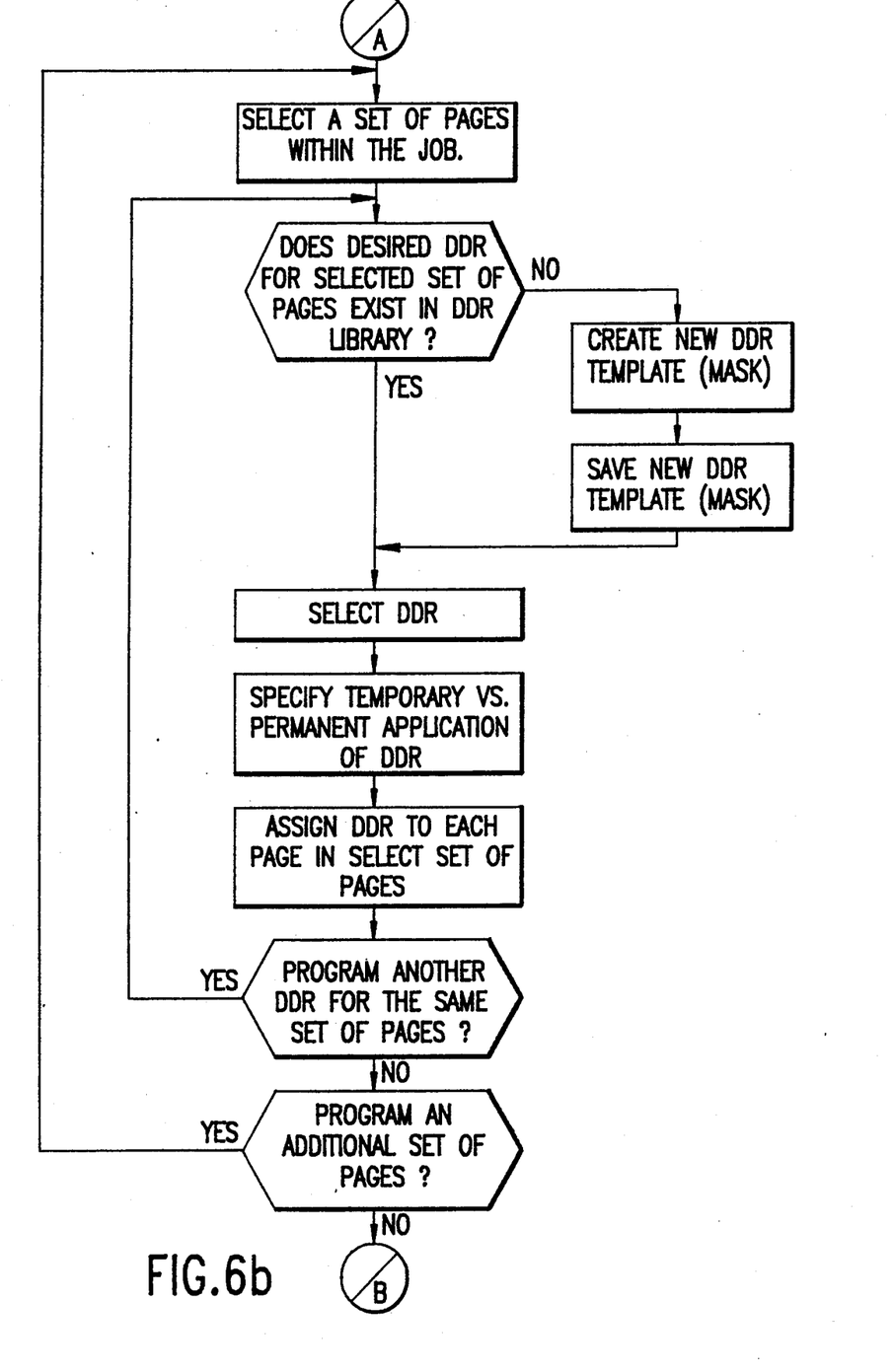

Specifically then, the process, for repairing common defects in the electronic page images 22 of a print job being processed by an exemplary electronic reprographic system 2 where the system includes (as described above) a printer 8 for producing prints from the page images 22 in response to user commands input through UI 52 using touchscreen 62, is shown in FIGS. 6a–6b and operates as follows:

First, the operator begins job programming (FIG. 6a), i.e., the job has not yet been received via a network or scanned by the system. Having decided the print job will require defect repair, the operator selects a set of pages within the print job (see FIG. 6b). If the operator has in mind a particular DDR template or templates already stored in the template library, he may, before or after scanning, select the desired template or templates using the touchscreen 62 to correct expected page image defects (e.g., headers, footers, page numbers, tab showarounds, 3-hole drilled paper, staple holes and dog ears) through suitable user commands at the interactive touchscreen 62 (see also FIGS. 5a–5d).

Figure 5A:
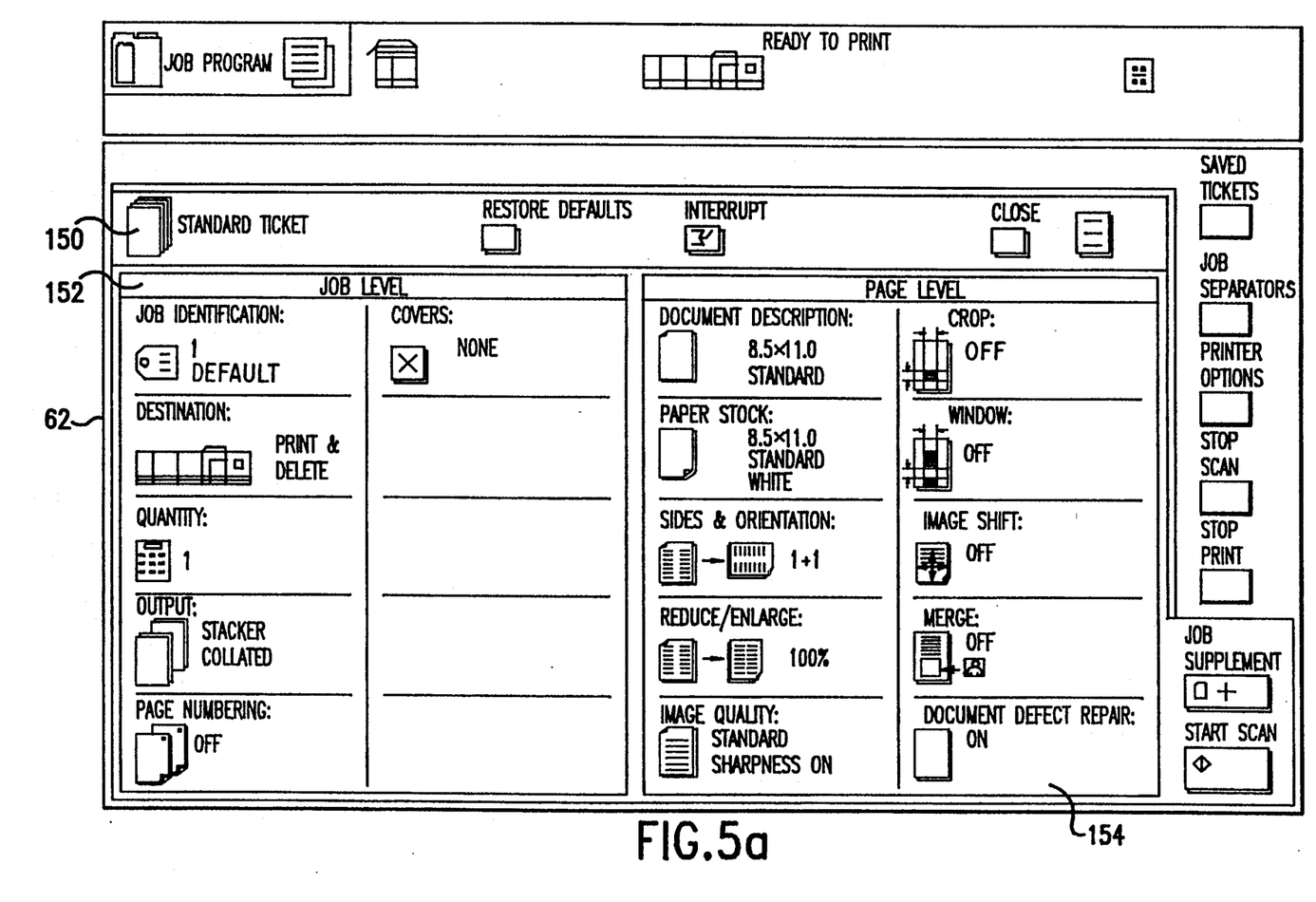
FIGS. 5a–5d are views depicting exemplary job programming tickets displayed on the User Interface (UI) touchscreen of the reprographic system shown in FIG. 2.

The operator, using the interactive touchscreen 62, selects Document Defect Repair—ON, at the page level menu 154 (see FIG. 5a). He/she must next decide (see FIG. 5b) whether to use standard DDR templates stored in the DDR template library 160, or to create a new DDR template tailored to the specific defects present on the page images 22 being processed (i.e., DDR template creation 162).

Figure 5B:
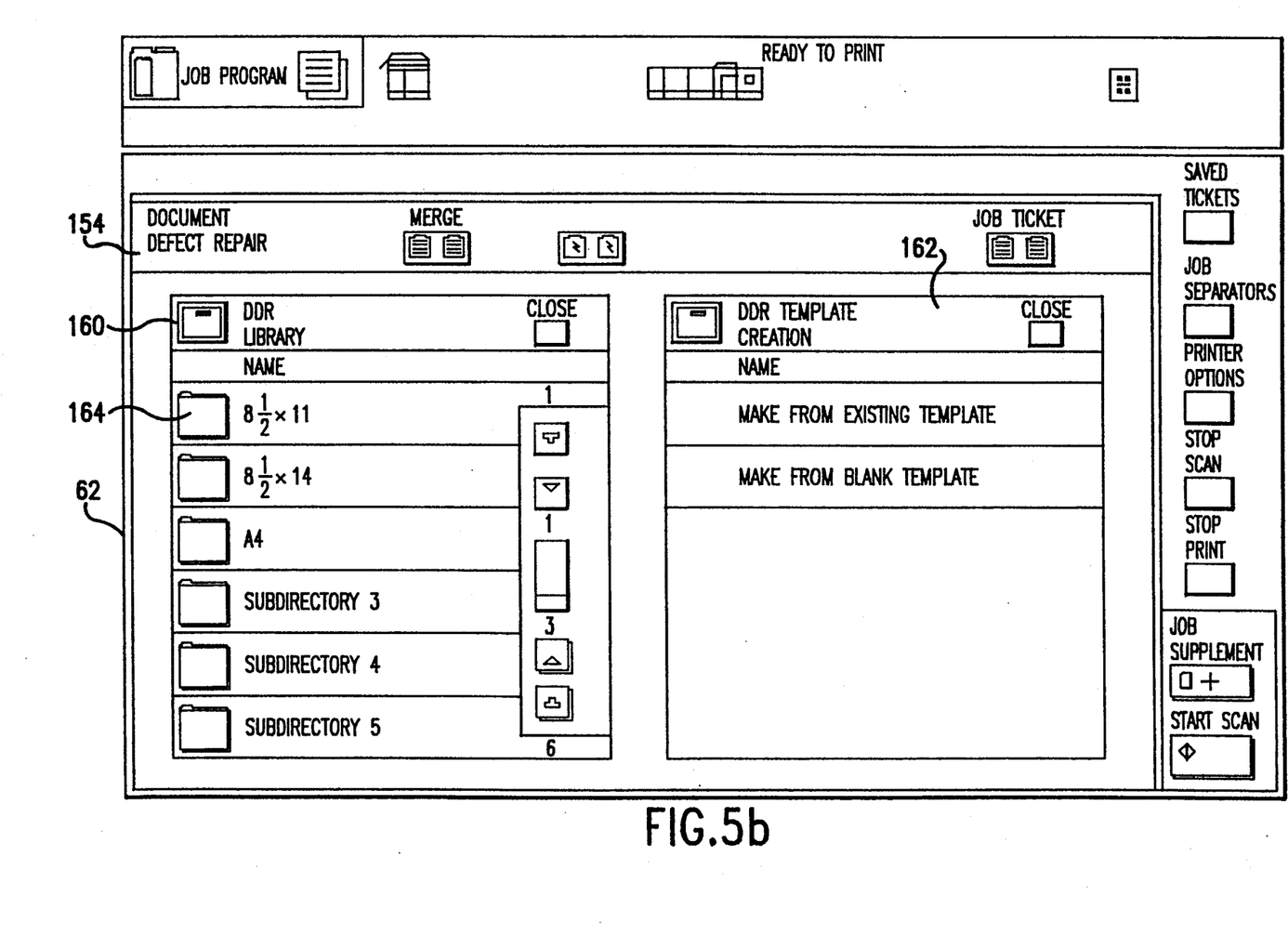
Figure 5C:
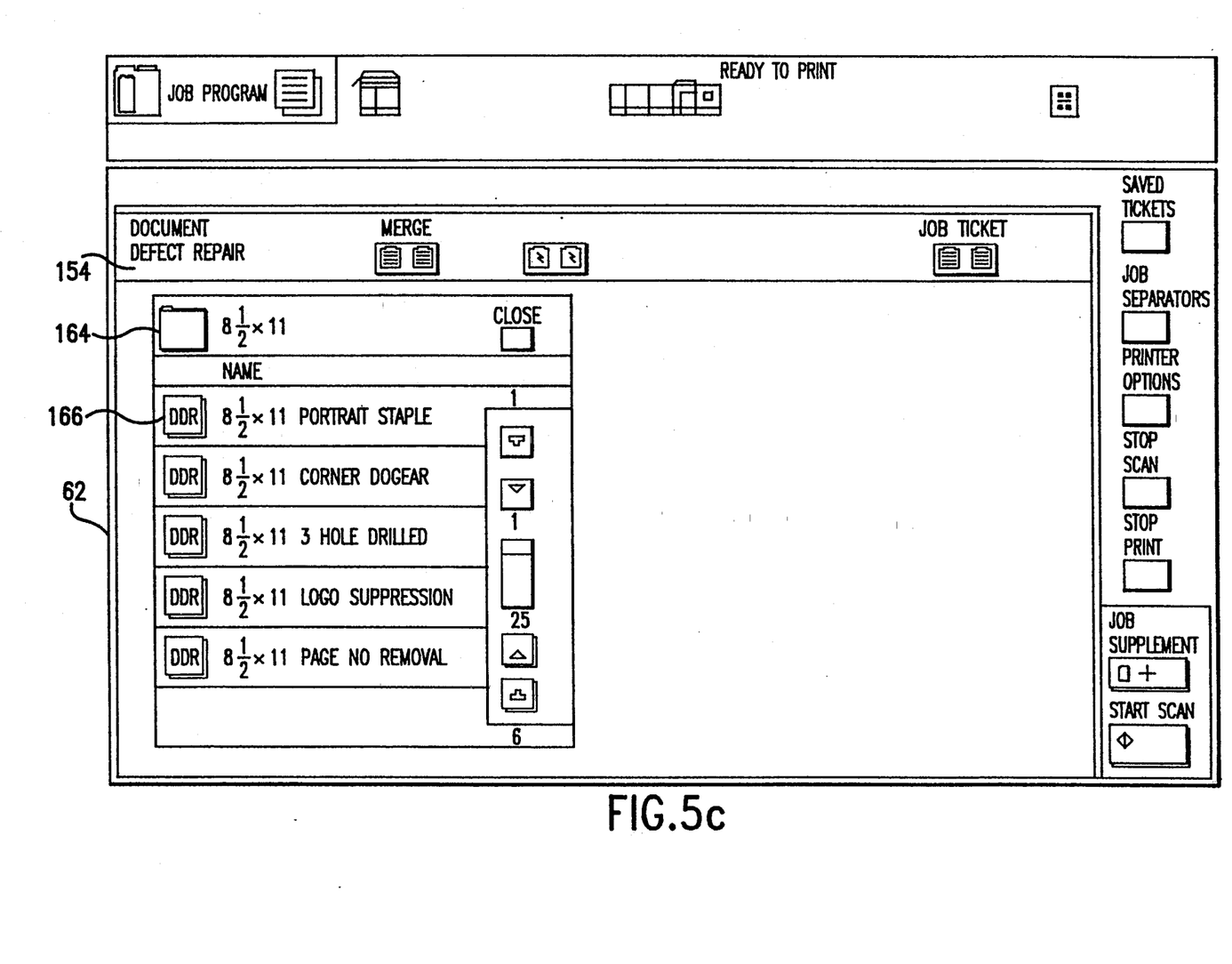
Figure 5D:
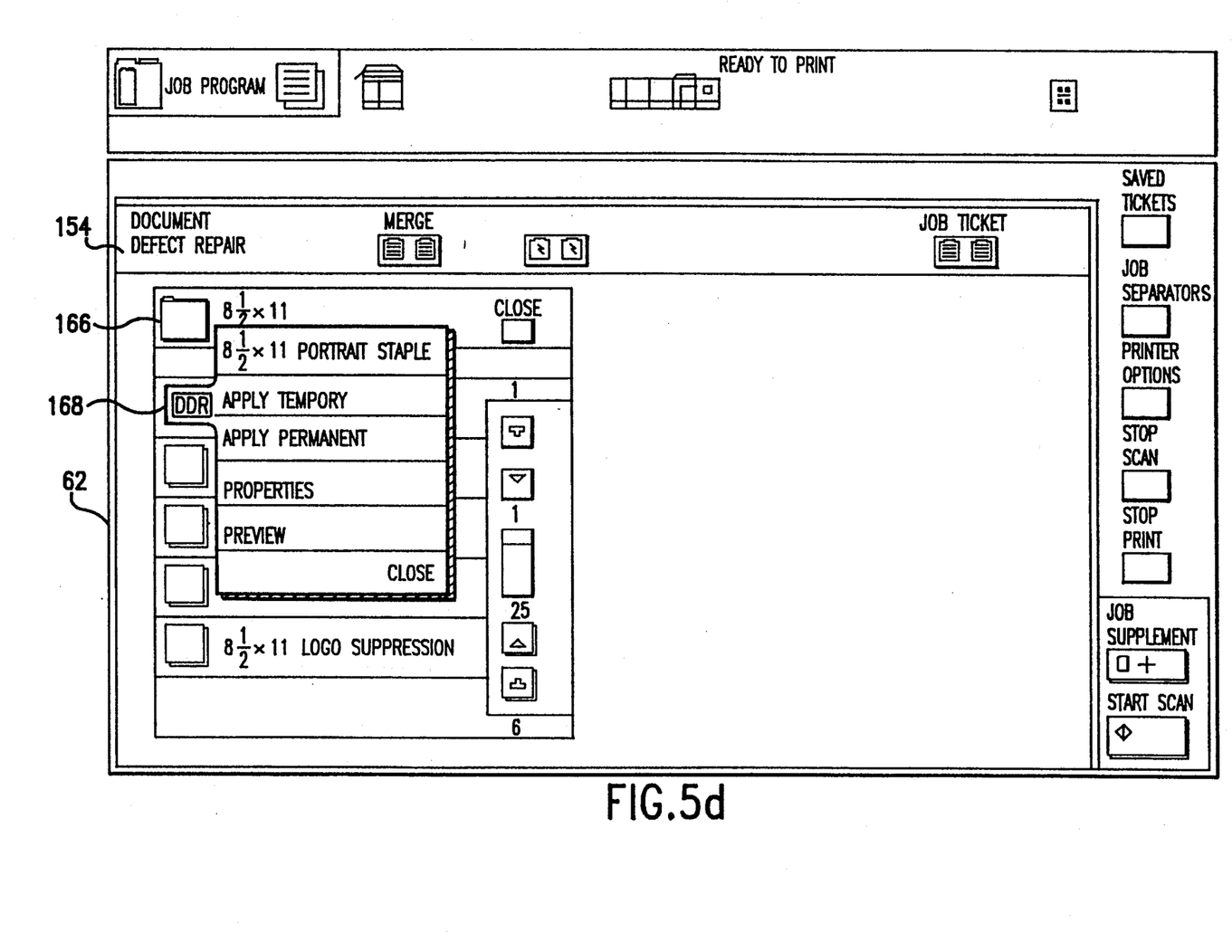

If the operator chooses to proceed using the DDR template library 160 (see FIGS. 5b and 5c), a listing of stored template selections will then be displayed from which he can choose. For purposes of example, the operator selects the 8½×11 folder 164 (as shown in FIG. 5b). There, the operator may choose from the library of DDR templates stored in the 8½×11 folder 164 (FIG. 5c) For our example, the operator selects the 8½×11 portrait staple template 166 and specifies (see FIG. 5d) whether the template is to be temporarily or permanently assigned 168 to each page in the selected set of pages. Now the operator is free to program another DDR for the same set of pages (repeating the steps just described) or of programming an additional set of pages.

Should the operator decide to create a new DDR template (or templates) he will choose a DDR template creation method from the DDR template creation menu 162 (see FIG. 5b). The operator may chose to create the DDR template using the "Make From Existing Template" method which utilizes existing masking templates stored in the DDR Library as a starting point. Selecting this option will eventually lead the operator (through selection prompts) to the menu shown in FIG. 5c (for 8½×11 document) The operator may then modify the size, position or shape of existing masking elements on the created DDR template, through appropriate graphic image editing instructions (not depicted, but understood in the art). Operators may also add new masking elements or delete existing masking elements from the created template as desired. The operator may also revise the size and orientation of the template, for example, change an 8½×11 portrait template to an 8½×14 landscape template.

Alternatively, the operator may choose to create a DDR template (see FIGS. 2 and 5b) without using those stored in the DDR template library as a starting point. For this, the "Make From Blank Template" method must be selected (FIG. 5b). The operator obtains a digitized page image or images 22 from main memory 56 and displays on the touchscreen 62 a page image to be used as a representative sample of the pages to be repaired (e.g., this page image may be a part of a job to be scanned or part of a previously scanned job). Using graphic image editing instructions, the operator can lay out the area or areas to be masked by defining their size, shape and position relative to the sample image. In this way, the electronic mask may be tailored to mask all defects yet retain all other substrate images contained on the page image 22.

Next, the operator completes job programming and scans the page images. The reprographic system then determines whether each page is programmed to receive DDR(s). If so, it retrieves each DDR template, applies the DDR template(s) to each relevant page image and stores it in memory. Finally, any remaining pages in the job not already scanned, are scanned by the reprographic system. Now the job is stored in memory, ready for printing or other action. It should be understood that the above created DDR templates could also be applied to images post scan or after received from remote systems or devices via network.

While the present invention has been described in connection with the preferred embodiment, it will be understood that it is not intended to limit the invention to this embodiment. On the contrary, it is intended to cover all alternatives, modifications and equivalents as may be included within the spirit and scope of the invention as defined by the appended claims.

What is claimed is:

1. A process for repairing defects in electronic page images of a print job being processed by an electronic reprographic system, said reprographic system including a printer for producing prints from said page images in response to job program instructions, and a user interface with a display screen and at least one command input device for inputting said job program instructions for said print job, comprising the steps of:
    a) beginning job programming;
    b) selecting at least one set of pages within the print job for document defect repair, each page having at least one defect;
    c) selecting at least one document defect repair template from a document defect repair template library of said reprographic system for overlapping association with said at least one set of pages to electronically mask-out said at least one defect;
    d) assigning said at least one document defect repair template to each page of said at least one set of pages within the print job;
    e) repeating steps (b) through (d) for all remaining sets of pages within the print job having at least one defect;
    f) complete job programming;
    g) scanning print job pages thereby creating digitized page images of each page;
    h) retrieving said at least one document defect repair template;
    i) applying said at least one document defect repair template to said page image of each page assigned in step (d);
    j) storing said page images with said at least one document defect repair template applied in at least one of a main memory and a disk of the reprographic system; and
    k) printing the print job containing said page images with said at least one document defect repair template applied.

2. The process according to claim 1, wherein said process further comprises:
    a) creating at least one document defect repair template by tailoring a document defect repair template already stored in said document defect repair template library using job program instructions;
    b) masking out at least one defect electronically using job program instructions input through said user interface; and
    c) storing said at least one created document defect repair template in said document defect repair library by job program instruction using said user interface.

3. The process according to claim 1, wherein said process further comprises:
    a) creating at least one document defect repair template, not included in said document defect repair template library, precisely configured to electronically mask out at least one defect using job program instructions input through said user interface; and
    b) storing said at least one created document defect repair template in said document defect repair template library by job program instruction using said user interface.

4. The process according to claim 1, wherein said applying step further comprises:
    selecting said at least one document defect repair template for temporary application by job program instruction using said user interface.

5. The process according to claim 1, wherein said applying step further comprises:
    selecting said at least one document defect repair template for permanent application by job program instruction using said user interface.

6. The process according to claim 1, wherein said at least one document defect repair template is applied through job program instructions to a range of defective page images without the print job being scanned by the electronic reprographic system.

7. The process according to claim 1, wherein size and position of said at least one document defect repair template may be varied by user command using said user interface.

8. The process according to claim 1, wherein a plurality of multiple region document defect repair templates are electronically applied simultaneously to mask a plurality of page image defects by job program instruction using said user interface.

9. A process for repairing defects in electronic page images of a print job already one of scanned and received from one of remote systems and devices and being processed by an electronic reprographic system, said reprographic system including a printer for producing prints from said page images in response to user commands, and a user interface with display screen and at least one command input device for inputting said user commands for said print job, said process comprising the steps of:
    a) beginning job reprogramming;
    b) selecting at least one set of page images within the print job for document defect repair, each page image having at least one defect;
    c) selecting at least one document defect repair template from a document defect repair template library of said reprographic system for overlapping association with said at least one set of page images to electronically mask-out said at least one defect;
    d) assigning said at least one document defect repair template to each page image of said at least one set of page images within the print job;
    e) repeating steps (b) through (d) for all remaining sets of page images within the print job having at least one defect;
    f) complete job reprogramming;
    g) retrieving said at least one document defect repair template;
    h) applying said at least one document defect repair template to each page image assigned in step (d);
    i) storing said page images with said at least one document defect repair template applied in at least one of a main memory and a disk of the reprographic system; and j) printing the print job containing said reprogrammed page images with said at least one document defect repair template applied.

10. The process according to claim 9, wherein said process further comprises:
    a) creating at least one document defect repair template by tailoring a document defect repair template already stored in said document defect repair template library by user command using said user interface;
    b) masking out at least one defect electronically by user command input through said user interface; and
    c) storing said at least one created document defect repair template in said document defect repair library by user command using said user interface.

11. The process according to claim 9, wherein said process further comprises:
    a) creating at least one document defect repair template, not included in said document defect repair template library, precisely configured to electronically mask out at least one defect by user command input through said user interface; and
    b) storing said at least one created document defect repair template in said document defect repair template library by job program instruction using said user interface.

12. The process according to claim 9, wherein said applying step further comprises:
    selecting said at least one document defect repair template for temporary application by user command using said user interface.

13. The process according to claim 9, wherein said applying step further comprises:
    selecting said at least one document defect repair template for permanent application by user command using said user interface.

14. The process according to claim 9, wherein size and position of said at least one document defect repair template may be varied by user command using said user interface.

15. The process according to claim 9, wherein a plurality of multiple region document defect repair templates are electronically applied simultaneously to mask a plurality of page image defects by user command using said user interface.

16. A process for repairing defects of a print job being processed by a reprographic system, comprising the steps of:
    a) selecting at least one page within the print job for document defect repair, said page having at least one defect;
    b) retrieving at least one document defect repair template from a document defect repair template library of said reprographic system; and
    c) assigning said at least one document defect repair template for overlapping association with said at least one page to electronically mask-out said at least one defect.

17. The process of claim 16, further comprising storing said at least one assigned document repair template in at least one of a main memory and a disk of said reprographic system, and printing the print job containing said at least one page with at least one document defect repair template applied thereto.

18. The process of claim 16, wherein said selecting step, said retrieving step, and said assigning step are performed prior to scanning the print job.

19. The process of claim 16, wherein said selecting step, said retrieving step, and said assigning step are performed after scanning the print job.

* * * * *